United States Patent
Cascia

(10) Patent No.: US 10,288,321 B2
(45) Date of Patent: *May 14, 2019

(54) ENERGY-EFFICIENT INTEGRATED LIGHTING, DAYLIGHTING, AND HVAC WITH ELECTROCHROMIC GLASS

(71) Applicant: Siemens Industry, Inc., Alpharetta, GA (US)

(72) Inventor: Mark A. Cascia, Barrington, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/561,650

(22) PCT Filed: Sep. 23, 2015

(86) PCT No.: PCT/US2015/051577
§ 371 (c)(1),
(2) Date: Sep. 26, 2017

(87) PCT Pub. No.: WO2016/182592
PCT Pub. Date: Nov. 17, 2016

(65) Prior Publication Data
US 2018/0073775 A1 Mar. 15, 2018

Related U.S. Application Data

(60) Provisional application No. 62/159,745, filed on May 11, 2015.

(51) Int. Cl.
*F24S 50/40* (2018.01)
*G02F 1/153* (2006.01)
(Continued)

(52) U.S. Cl.
CPC .............. *F24S 50/40* (2018.05); *G02F 1/153* (2013.01); *G02F 1/1533* (2013.01); *G02F 1/163* (2013.01);
(Continued)

(58) Field of Classification Search
CPC ......... F24F 11/006; F24F 13/08; G05B 15/02; E06B 9/38; E06B 9/68; E06B 9/24
See application file for complete search history.

(56) References Cited

U.S. PATENT DOCUMENTS

| | | | | |
|---|---|---|---|---|
| 6,064,949 A | * | 5/2000 | Werner | G05D 27/02 250/214 AL |
| 2003/0233172 A1 | | 12/2003 | Granqvist et al. | |

(Continued)

OTHER PUBLICATIONS

Rao, Christopher V. et al. "Linear programming and model predictive control" in: Journal of Process Control (2000), vol. 10, pp. 293-289.*

PCT International Search Report and Written Opinion of International Searching Authority dated Mar. 11, 2016 corresponding to PCT International Application No. PCT/US2015/051577 filed Sep. 23, 2015.

*Primary Examiner* — Robert E Fennema
*Assistant Examiner* — Jonathan M Skrzycki

(57) ABSTRACT

Methods for integrated room management in a building management system and corresponding systems and computer-readable mediums. A method includes determining (702) a solar heat gain coefficient (SHGC) for a room (400) in a building and determining (704) predicted open-loop room (400) temperatures at a plurality of time intervals based on the SHGC and a plurality of electrochromic glass (ECG) (408) tint levels. The method includes determining (706) illumination heat and illumination energy for the room (400) and determining (708) climate energy for the room (400). The method includes determining (710) a total room energy at each of the time intervals as a function of the ECG (408) tint levels based on the climate energy, illumination energy, and predicted open-loop room temperatures. The (Continued)

method includes determining (712) an optimal ECG (408) tint level that minimizes the total room energy at each of the time intervals and controlling (714) the ECG (408) tint levels according to the optimal ECG tint level.

20 Claims, 6 Drawing Sheets

(51) Int. Cl.
*G02F 1/163* (2006.01)
*G05B 15/02* (2006.01)
(52) U.S. Cl.
CPC ...... *G05B 15/02* (2013.01); *G05B 2219/2642* (2013.01)

(56) References Cited

U.S. PATENT DOCUMENTS

| | | | |
|---|---|---|---|
| 2008/0281472 A1* | 11/2008 | Podgorny | G05B 15/02 700/276 |
| 2011/0096253 A1* | 4/2011 | Zhang | C09K 19/3068 349/16 |
| 2013/0057937 A1 | 3/2013 | Berman et al. | |
| 2013/0190940 A1 | 7/2013 | Sloop et al. | |
| 2014/0067733 A1 | 3/2014 | Humann et al. | |
| 2014/0236323 A1* | 8/2014 | Brown | G02F 1/163 700/90 |
| 2015/0234369 A1* | 8/2015 | Wen | F24F 11/30 700/278 |

\* cited by examiner

ENERGY-EFFICIENT INTEGRATED LIGHTING, DAYLIGHTING, AND HVAC WITH ELECTROCHROMIC GLASS

CROSS-REFERENCE TO OTHER APPLICATION

This application claims the benefit of the filing date of U.S. Provisional Patent Application 62/159,745, filed May 11, 2015, which is hereby incorporated by reference. This application also shares some subject matter in common with U.S. patent application Ser. No. 14/709,271, filed May 11, 2015, for "Energy-Efficient Integrated Lighting, Daylighting, and HVAC with Controlled Window Blinds," which is hereby incorporated by reference.

TECHNICAL FIELD

The present disclosure is directed, in general, to building-control systems, and in particular to control of automated lighting, heating, cooling, and electrochromic glass systems.

BACKGROUND OF THE DISCLOSURE

Building automation systems encompass a wide variety of systems that aid in the monitoring and control of various aspects of building operation. Building automation systems include security systems, fire safety systems, lighting systems, and HVAC systems. The elements of a building automation system are widely dispersed throughout a facility. For example, an HVAC system may include temperature sensors and ventilation damper controls, as well as other elements, that are located in virtually every area of a facility. These building automation systems typically have one or more centralized control stations from which system data may be monitored and various aspects of system operation may be controlled and/or monitored.

To allow for monitoring and control of the dispersed control system elements, building automation systems often employ multi-level communication networks to communicate operational and/or alarm information between operating elements, such as sensors and actuators, and the centralized control station. One example of a building automation system is the Site Controls Controller, available from Siemens Industry, Inc. Building Technologies Division of Buffalo Grove, Ill. ("Siemens"). In this system, several control stations connected via an Ethernet, MSTP or another type of network may be distributed throughout one or more building locations, each having the ability to monitor and control system operation.

SUMMARY OF THE DISCLOSURE

This disclosure describes methods for integrated room management in a building management system and corresponding systems and computer-readable mediums. According to one embodiment, a method includes determining a solar heat gain coefficient (SHGC) for a room in a building, based on the geographic location of the room and orientation of the exterior window(s), at a plurality of time intervals. The method includes determining predicted open-loop room temperatures ("open-loop" means with the terminal cooling or heating equipment turned off) for the room at the plurality of time intervals based on the SHGC and a plurality of window glass tint levels. The method includes determining illumination in the room and the thermal energy of the terminal heating or cooling equipment required to condition the room, at each window glass tint level and at each time interval, based on the measured exterior illumination level of the sun for each window glass tint level, measured artificial lighting energy consumed, and measured artificial lighting heat produced to bring the room to a predetermined illumination level. The method includes determining room climate energy, at each of the time intervals, required to maintain the room at a predetermined temperature based on the predicted open-loop room temperature response and the calculated thermal energy of the terminal heating or cooling equipment and illumination heat at each of the time intervals. The method includes adding the calculated thermal energy of the terminal heating or cooling equipment to the electrical lighting thermal energy to determine a total room energy at each of the time intervals as a function of the window glass tint levels based on the room climate energy and illumination energy required to condition and illuminate the room. The method includes determining, from the total room energy, an optimal glass tint level at each of the time intervals, wherein the optimal glass tint level minimizes the total room energy at each of the time intervals. The method includes controlling the glass tint levels in the room at each of the time intervals according to the optimal glass tint levels, unless there is an override condition. The system can enter an override condition in response to detecting beam solar radiation in the room. The system can enter an override condition in response to a manual user control of the electrochromic glass (ECG) tint level, and thereafter controls the glass tint levels according to the manually set tint level.

Another method includes determining a solar heat gain coefficient (SHGC) for a room in a building at a plurality of time intervals. The method includes determining predicted open-loop room temperatures for the room at the plurality of time intervals based on the SHGC and a plurality of electrochromic glass (ECG) tint levels. The method includes determining illumination heat and illumination energy for the room, at each ECG tint level and at each time interval, based on a measured solar illumination level for each ECG tint level, artificial lighting energy consumed, and artificial lighting heat produced to bring the room to a predetermined illumination level. The method includes determining climate energy, at each of the time intervals, required to maintain the room at a predetermined temperature based on the predicted open-loop room temperatures and the illumination heat at each of the time intervals. The method includes determining a total room energy at each of the time intervals as a function of the ECG tint levels based on the climate energy, illumination energy, and predicted room temperatures. The method includes determining, from the total room energy, an optimal ECG tint level at each of the time intervals, wherein the optimal ECG tint level minimizes the total room energy at each of the time intervals. The method includes controlling the ECG tint levels in the room at each of the time intervals according to the optimal ECG tint level, unless there is an override condition.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
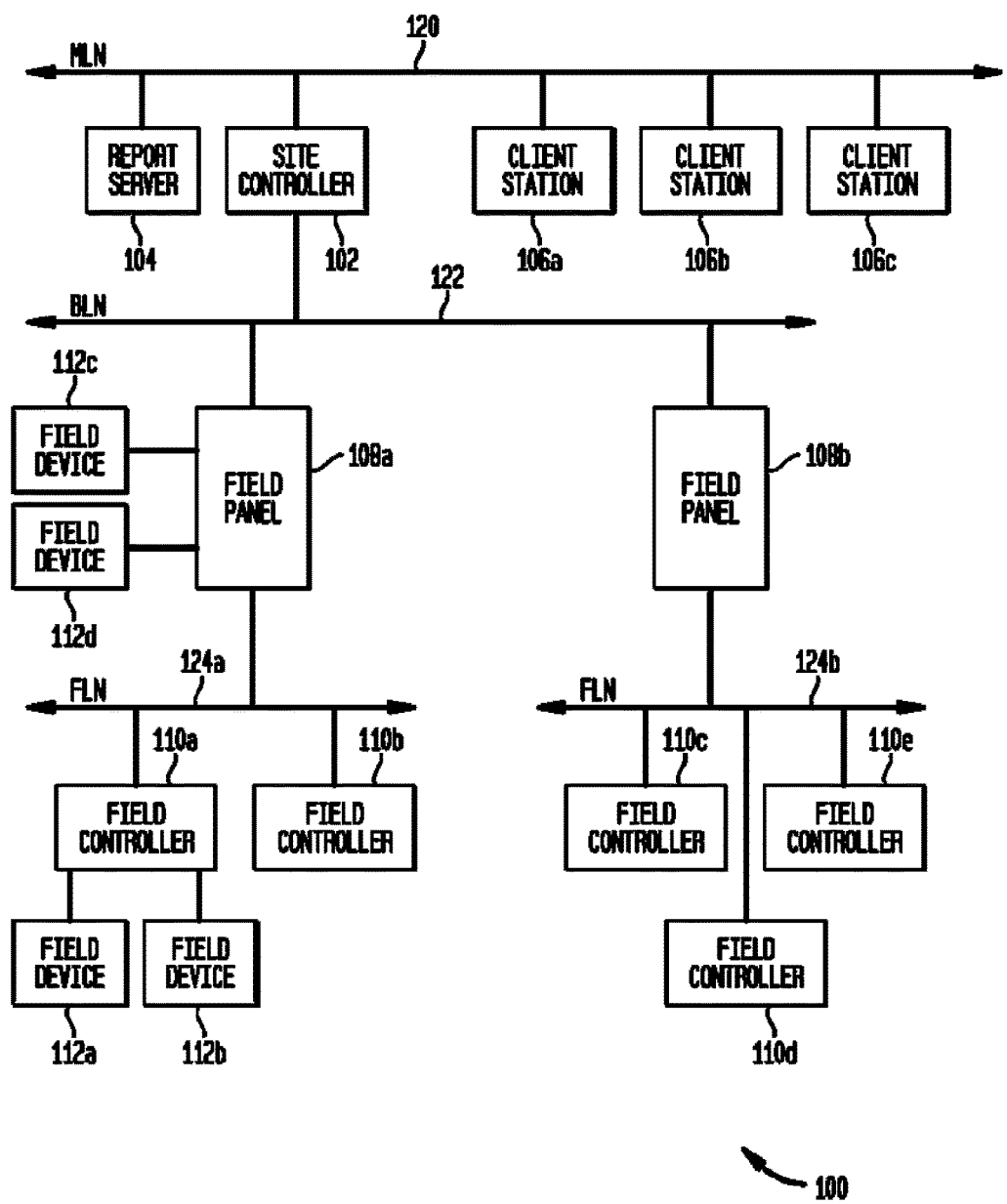
FIG. 1 illustrates a block diagram of a building automation system in which the energy efficiency of a heating, ventilation, and air conditioning (HVAC) system may be improved in accordance with the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Disclosed embodiments include systems and methods for optimization of room control for the perimeter building zones that have facades with windows with ECG. "Optimization" control refers to minimization of energy and maintenance of acceptable lighting and thermal comfort conditions for room occupants. Occupant comfort in a building environment includes both thermal comfort (temperature and relative humidity in the right range) and good lighting conditions (which includes absence or minimization of glare). Daylighting, the control of illumination from daylight, will be adjusted by means of controlling the ECG tint level. One non-limiting example of an ECG that can be used in some implementations is the SageGlass electrochromic glass manufactured by SAGE Electrochromics, Inc.

Disclosed embodiments can be used with many different building types, and are particularly advantageous for use in office buildings since office buildings generally require a given illumination level (e.g. in footcandles or lux) on workplane surfaces to provide adequate lighting for its workers.

Specific terms that may be used herein are described below. A candela (cd) is a measure of intensity of light source in a given direction. A clo is a unit used to express the thermal insulation provided by garments and clothing ensembles, where 1 clo=0.155 m2-° C./W (0.88 ft2-h-° F./Btu). Energy (heat) flux refers to energy flow per unit area (BTU/hr-ft2). Fenestration is an architectural term that refers to the arrangement, proportion, and design of window, skylight, and door systems in a building. Fenestration can serve as a physical and/or visual connection to the outdoors, as well as a means to admit solar radiation for daylighting, and for heat gain to a space.

Footcandles (fc) indicates the density of light landing on a surface, and is generally measured in lumens per sq.ft. Glare refers to luminances within the field of vision that are too great for the eye to adapt to. The indoor solar attenuation coefficient (IAC) represents the fraction of heat flow that enters the room, some energy having been excluded by the shading. Depending on the type of shade, it may vary angularly and with shade type and geometry. Illuminance is a measure of light incident on a surface, generally measured in lumens per sq.ft. Luminance measures the brightness of a surface when viewed from a particular direction and is generally expressed in candelas per square meter. Lumen (lm) refers to the total amount of light emanating from a light source. Lux refers to the International System of Units (SI) unit of light density equivalent to footcandles (the English unit), where 1 lux=1 lumen per square meter.

The use of daylighting in building designs is increasingly being recognized as a primary way to not only reduce electrical lighting energy consumption in buildings but to enhance indoor environmental quality (IEQ) for the people (workers) present in the building. When designing for maximum daylight, designers must evaluate and balance a number of environmental factors, such as heat gain and loss, glare control, visual quality, and variations in daylight availability. Daylighting can enhance IEQ in several ways: by providing a natural view to the outdoors, providing natural daylight to work surfaces, and reducing glare from electrical lighting. Studies have shown that when IEQ is enhanced, worker productivity increases, student test scores increase, and absenteeism is reduced.

Offices with sufficient natural daylight and a visual connection to the outdoors have been proven to increase occupant productivity and comfort, leading to better employee retention and reduced absenteeism. Successful daylighting designs can use diffuse light from the sky through both skylights and window facades, and use daylighting as the primary source of illumination inside a building. Successful daylighting designs when the daylighting controls are integrated with the electric lighting system provide not only electrical lighting energy savings, but a quality visual environment, with worker productivity increases and reduced absenteeism.

Daylighting reduces the need for electrical lighting of building interiors, which, if integrated into the overall approach to lighting, can result in a significant decrease in electrical lighting requirements. A well-designed daylit building is estimated to reduce lighting energy use by 50% to 80%. According to the U.S. Department of Energy, the energy used in U.S. office buildings consumed by HVAC systems accounts for 51% of the total energy required and 25% of the lighting energy required. Therefore, a primary target for reducing energy consumption in office buildings is to minimize HVAC and lighting energy.

Electrochromic glass (ECG) is glass or glazing whose light transmission properties are altered when voltage is applied across the thickness of the glass. Generally, the opacity of the glass changes from translucent to transparent, changing from blocking some (or all) wavelengths of light to letting light pass through. ECG can be used to control daylight into a perimeter space by light transmission through the window glass. In general, maximizing daylighting will minimize the need for electric lighting, and while the maximizing of daylighting will reduce heating loads in winter (the heating season), the solar heat gain through windows will also increase cooling loads in summer (the cooling season). In addition, in an office environment, direct daylighting into a space can also cause glare, and minimization of glare must be included along with thermal comfort as the top priority to provide a comfortable environment for employees. Therefore, one objective is to provide maximum daylighting for the dynamic shading systems while minimizing glare, and then once glare has been minimized (such as on a cloudy day, or when the sun is not directly striking the window surfaces) to maximize daylighting, up to the point where the cooling load from the added solar heat gain becomes excessive.

The general control objectives of the dynamic shading systems can be summed up as balancing the need to block direct sunlight, thereby reducing glare and solar heat gains during the cooling season, the need to allow the maximum possible amount of daylight (and solar heat gain) during the heating season, the need to control direct sunlight by diffusing it into the space without causing glare on sunny days, the need to transmit all available daylight on overcast days, and in general the need to eliminate glare and create a pleasant luminous environment.

Current building management systems cannot integrate lighting and daylighting controls with HVAC controls to minimize total energy consumption while maintaining occupant comfort. Perimeter zones gain heat and light by the influx of solar radiation through the windows, which must be removed by cooling (or less heating) energy supplied to the space. Cooling and heating the space can be supplied by a variety of methods, depending on the type of HVAC supply air distribution system and terminal heating/cooling equipment.

In general, maximizing daylighting in a perimeter zone during the cooling season will minimize the need for electric lighting, but may increase cooling loads in the zone to maintain the required space temperature conditions, and may cause glare. Similarly, maximizing daylighting in a perimeter zone during the heating season will minimize the need for electric lighting and reduce heating loads, but may cause occupant discomfort from direct sunlight penetrating deep into the space due to the relatively low position of the sun in wintertime as it arches across the sky.

Perimeter zones gain heat and light by the influx of solar radiation through the windows, which must be removed by cooling (or less heating) energy supplied to the space. Cooling and heating the space can be supplied by a variety of methods, depending on the type of HVAC supply air distribution system and terminal heating/cooling equipment.

In general, maximizing daylighting in a perimeter zone during the cooling season will minimize the need for electric lighting, but may increase cooling loads in the zone to maintain the required space temperature conditions, and may cause glare. Similarly, maximizing daylighting in a perimeter zone during the heating season will minimize the need for electric lighting and reduce heating loads, but may cause occupant discomfort from direct sunlight penetrating deep into the space due to the relatively low position of the sun in wintertime as it arches across the sky. Therefore, there are both energy and comfort trade-offs that should be made in the development of the system model.

When the ECG transmits or passes all or substantially all of the exterior lighting, minimal electrical lighting energy is needed but maximum cooling from the radiant cooling panels may be needed to meet required space temperature conditions. Likewise, when the ECG blocks all or substantially all of the exterior lighting, minimal radiant cooling is needed to meet space temperature conditions, but maximum electrical lighting may be needed to make up for the loss of daylighting by the high tint level of the ECG. In general, an optimal ECG glass tint level exists where total energy consumption is minimized.

However, the general problem of optimizing the ECG tint level to minimize energy consumption for a zone can be complex. The amount of daylighting available is highly variable, and depends not only on outside sun conditions, passing clouds, time of day, and season of year, but also on the design of the ECG itself. In addition, the "optimal" ECG tint level that may result in minimal total energy consumption may also produce glare conditions within the space and should not be chosen as the optimal tint level for the occupants of the space. Therefore, disclosed embodiments include an advanced analytical approach that can determine the overall ECG tint level that will minimize energy, with the constraint of minimizing glare.

FIG. 1 illustrates a block diagram of a building automation system 100 in which disclosed embodiments can be implemented. The building automation system 100 is an environmental control system configured to control at least one of a plurality of environmental parameters within a building, such as temperature, humidity, lighting and/or the like. For example, for a particular embodiment, the building automation system 100 may comprise the Site Controls Controller building automation system that allows the setting and/or changing of various controls of the system. While a brief description of the building automation system 100 is provided below, it will be understood that the building automation system 100 described herein is only one example of a particular form or configuration for a building automation system and that the system 100 may be implemented in any other suitable manner without departing from the scope of this disclosure.

For the illustrated embodiment, the building automation system 100 comprises a site controller 102, a report server 104, a plurality of client stations 106a-c, a plurality of field panels 108a-b, a plurality of field controllers 110a-e and a plurality of field devices 112a-d. Although illustrated with three client stations 106, two field panels 108, five field controllers 110 and four field devices 112, it will be understood that the system 100 may comprise any suitable number of any of these components 106, 108, 110 and 112 based on the particular configuration for a particular building.

The site controller 102, which may comprise a computer or a general-purpose processor, is configured to provide overall control and monitoring of the building automation system 100. The site controller 102 may operate as a data server that is capable of exchanging data with various elements of the system 100. As such, the site controller 102 may allow access to system data by various applications that may be executed on the site controller 102 or other supervisory computers (not shown in FIG. 1).

For example, the site controller 102 may be capable of communicating with other supervisory computers, Internet gateways, or other gateways to other external devices, as well as to additional network managers (which in turn may connect to more subsystems via additional low-level data networks) by way of a management level network (MLN) 120. The site controller 102 may use the MLN 120 to exchange system data with other elements on the MLN 120, such as the report server 104 and one or more client stations 106. The report server 104 may be configured to generate reports regarding various aspects of the system 100. Each client station 106 may be configured to communicate with the system 100 to receive information from and/or provide modifications to the system 100 in any suitable manner. The MLN 120 may comprise an Ethernet or similar wired network and may employ TCP/IP, BACnet, and/or other protocols that support high-speed data communications.

The site controller 102 may also be configured to accept modifications and/or other input from a user. This may be accomplished via a user interface of the site controller 102 or any other user interface that may be configured to communicate with the site controller 102 through any suitable network or connection. The user interface may include a keyboard, touchscreen, mouse, or other interface components. The site controller 102 is configured to, among other things, affect or change operational data of the field panels 108, as well as other components of the system 100. The site controller 102 may use a building level network (BLN) 122 to exchange system data with other elements on the BLN 122, such as the field panels 108.

Each field panel 108 may comprise a general-purpose processor and is configured to use the data and/or instructions from the site controller 102 to provide control of its one or more corresponding field controllers 110. While the site controller 102 is generally used to make modifications to one or more of the various components of the building automation system 100, a field panel 108 may also be able to provide certain modifications to one or more parameters of the system 100. Each field panel 108 may use a field level network (FLN) 124 to exchange system data with other elements on the FLN 124, such as a subset of the field controllers 110 coupled to the field panel 108.

Each field controller 110 may comprise a general-purpose processor and may correspond to one of a plurality of localized, standard building automation subsystems, such as building space temperature control subsystems, lighting control subsystems, or the like. For a particular embodiment, the field controllers 110 may comprise the model TEC (Terminal Equipment Controller) available from Siemens. However, it will be understood that the field controllers 110 may comprise any other suitable type of controllers without departing from the scope of the present invention.

To carry out control of its corresponding subsystem, each field controller 110 may be coupled to one or more field devices 112. Each field controller 110 is configured to use the data and/or instructions from its corresponding field panel 108 to provide control of its one or more corresponding field devices 112. For some embodiments, some of the field controllers 110 may control their subsystems based on sensed conditions and desired set point conditions. For these embodiments, these field controllers 110 may be configured to control the operation of one or more field devices 112 to attempt to bring the sensed condition to the desired set point condition. It is noted that in the system 100, information from the field devices 112 may be shared between the field controllers 110, the field panels 108, the site controller 102 and/or any other elements on or connected to the system 100. In specific embodiments described herein, field devices 112 can include ECG controllers that control ECG tint levels (the opacity of the glass and how much light is passed through the glass), temperature sensors, lighting/illumination controls or sensors, beam detectors that detect direct sunlight, and others. In some embodiments, the thermal environment of a room can be measured by dry bulb temperature and relative humidity sensors that functions the field devices 112.

In order to facilitate the sharing of information between subsystems, groups of subsystems may be organized into an FLN 124. For example, the subsystems corresponding to the field controllers 110a and 110b may be coupled to the field panel 108a to form the FLN 124a. The FLNs 124 may each comprise a low-level data network that may employ any suitable proprietary or open protocol.

Each field device 112 may be configured to measure, monitor and/or control various parameters of the building automation system 100. Examples of field devices 112 include lights, thermostats, temperature sensors, fans, damper actuators, heaters, chillers, alarms, HVAC devices, and numerous other types of field devices. The field devices 112 may be capable of receiving control signals from and/or sending signals to the field controllers 110, the field panels 108 and/or the site controller 102 of the building automation system 100. Accordingly, the building automation system 100 is able to control various aspects of building operation by controlling and monitoring the field devices 112.

As illustrated in FIG. 1, any of the field panels 108, such as the field panel 108a, may be directly coupled to one or more field devices 112, such as the field devices 112c and 112d. For this type of embodiment, the field panel 108a may be configured to provide direct control of the field devices 112c and 112d instead of control via one of the field controllers 110a or 110b. Therefore, for this embodiment, the functions of a field controller 110 for one or more particular subsystems may be provided by a field panel 108 without the need for a field controller 110.

Figure 2:
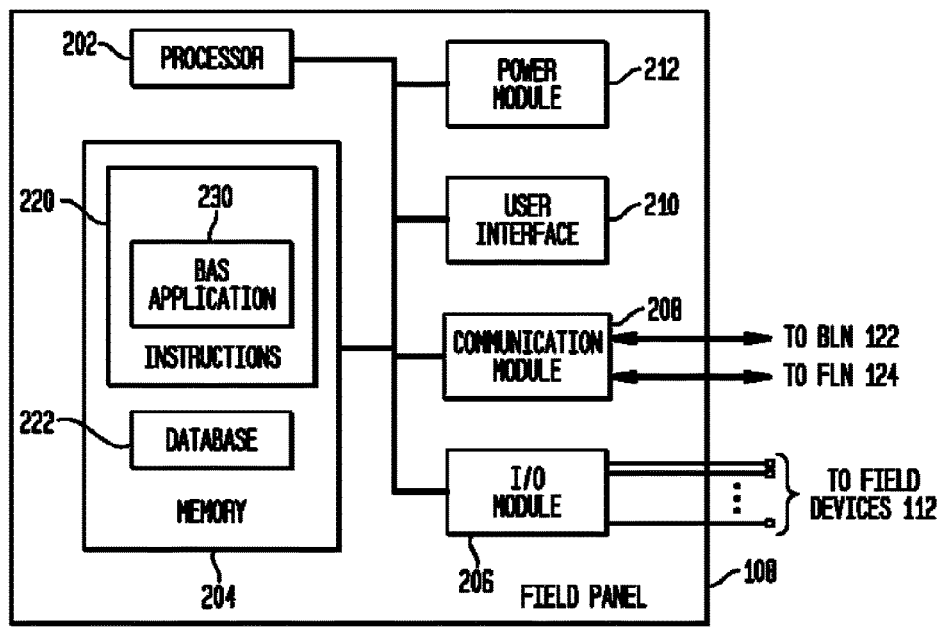
FIG. 2 illustrates details of one of the field panels of FIG. 1 in accordance with the present disclosure.

FIG. 2 illustrates details of one of the field panels 108 in accordance with the present disclosure. For this particular embodiment, the field panel 108 comprises a processor 202, a memory 204, an input/output (I/O) module 206, a communication module 208, a user interface 210 and a power module 212. The memory 204 comprises any suitable data store capable of storing data, such as instructions 220 and a database 222. It will be understood that the field panel 108 may be implemented in any other suitable manner without departing from the scope of this disclosure.

The processor 202 is configured to operate the field panel 108. Thus, the processor 202 may be coupled to the other components 204, 206, 208, 210 and 212 of the field panel 108. The processor 202 may be configured to execute program instructions or programming software or firmware stored in the instructions 220 of the memory 204, such as building automation system (BAS) application software 230. In addition to storing the instructions 220, the memory 204 may also store other data for use by the system 100 in the database 222, such as various records and configuration files, graphical views and/or other information.

Execution of the BAS application 230 by the processor 202 may result in control signals being sent to any field devices 112 that may be coupled to the field panel 108 via the I/O module 206 of the field panel 108. Execution of the BAS application 230 may also result in the processor 202 receiving status signals and/or other data signals from field devices 112 coupled to the field panel 108 and storage of associated data in the memory 204. In one embodiment, the BAS application 230 may be provided by the Site Controls Controller software commercially available from Siemens Industry, Inc. However, it will be understood that the BAS application 230 may comprise any other suitable BAS control software.

The I/O module 206 may comprise one or more input/output circuits that are configured to communicate directly with field devices 112. Thus, for some embodiments, the I/O module 206 comprises analog input circuitry for receiving analog signals and analog output circuitry for providing analog signals.

The communication module 208 is configured to provide communication with the site controller 102, other field panels 108 and other components on the BLN 122. The communication module 208 is also configured to provide communication to the field controllers 110, as well as other components on the FLN 124 that is associated with the field panel 108. Thus, the communication module 208 may comprise a first port that may be coupled to the BLN 122 and a second port that may be coupled to the FLN 124. Each of the ports may include an RS-485 standard port circuit or other suitable port circuitry.

The field panel 108 may be capable of being accessed locally via the interactive user interface 210. A user may control the collection of data from field devices 112 through the user interface 210. The user interface 210 of the field panel 108 may include devices that display data and receive input data. These devices may be permanently affixed to the field panel 108 or portable and moveable. For some embodiments, the user interface 210 may comprise an LCD-type screen or the like and a keypad. The user interface 210 may be configured to both alter and show information regarding the field panel 108, such as status information and/or other data pertaining to the operation of, function of and/or modifications to the field panel 108.

The power module 212 may be configured to supply power to the components of the field panel 108. The power module 212 may operate on standard 120 volt AC electricity, other AC voltages or DC power supplied by a battery or batteries.

Figure 3:
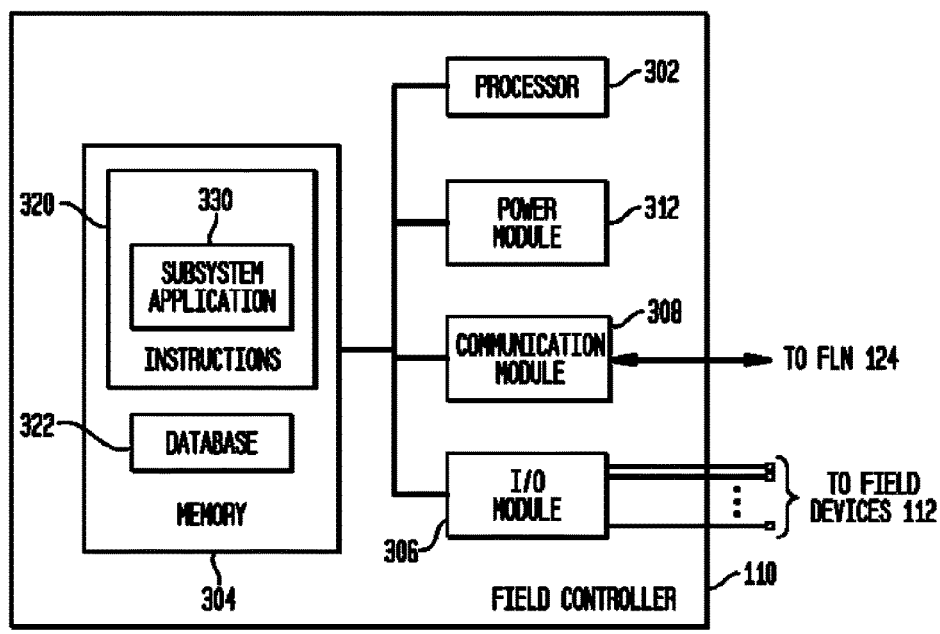
FIG. 3 illustrates details of one of the field controllers of FIG. 1 in accordance with the present disclosure.

FIG. 3 illustrates details of one of the field controllers 110 in accordance with the present disclosure. For this particular embodiment, the field controller 110 comprises a processor 302, a memory 304, an input/output (I/O) module 306, a communication module 308 and a power module 312. For some embodiments, the field controller 110 may also comprise a user interface (not shown in FIG. 3) that is configured to alter and/or show information regarding the field controller 110. The memory 304 comprises any suitable data store capable of storing data, such as instructions 320 and a database 322. It will be understood that the field controller 110 may be implemented in any other suitable manner without departing from the scope of this disclosure. For some embodiments, the field controller 110 may be positioned in, or in close proximity to, a room of the building where temperature or another environmental parameter associated with the subsystem may be controlled with the field controller 110.

The processor 302 is configured to operate the field controller 110. Thus, the processor 302 may be coupled to the other components 304, 306, 308 and 312 of the field controller 110. The processor 302 may be configured to execute program instructions or programming software or firmware stored in the instructions 320 of the memory 304, such as subsystem application software 330. For a particular example, the subsystem application 330 may comprise a temperature control application that is configured to control and process data from all components of a temperature control subsystem, such as a temperature sensor, a damper actuator, fans, and various other field devices. In addition to storing the instructions 320, the memory 304 may also store other data for use by the subsystem in the database 322, such as various configuration files and/or other information.

Execution of the subsystem application 330 by the processor 302 may result in control signals being sent to any field devices 112 that may be coupled to the field controller 110 via the I/O module 306 of the field controller 110. Execution of the subsystem application 330 may also result in the processor 302 receiving status signals and/or other data signals from field devices 112 coupled to the field controller 110 and storage of associated data in the memory 304.

The I/O module 306 may comprise one or more input/output circuits that are configured to communicate directly with field devices 112. Thus, for some embodiments, the I/O module 306 comprises analog input circuitry for receiving analog signals and analog output circuitry for providing analog signals.

The communication module 308 is configured to provide communication with the field panel 108 corresponding to the field controller 110 and other components on the FLN 124, such as other field controllers 110. Thus, the communication module 308 may comprise a port that may be coupled to the FLN 124. The port may include an RS-485 standard port circuit or other suitable port circuitry.

The power module 312 may be configured to supply power to the components of the field controller 110. The power module 312 may operate on standard 120 volt AC electricity, other AC voltages, or DC power supplied by a battery or batteries.

The heating and cooling energy being supplied to a zone can be explicitly defined and quantified by heat transfer equations, but the amount of daylighting available from ECG adjustment is highly variable, depending on outside sun conditions, time of day, season of year, and glare considerations. Other objectives include blocking direct sunlight, thereby reducing glare and solar heat gains during the cooling season, allowing the maximum possible amount of daylight (and solar heat gain) during the heating season, controlling direct sunlight by diffusing it into the space without causing glare on sunny days, transmitting all available daylight on overcast days, and eliminating glare and creating a pleasant luminous environment.

Glare can be very difficult to measure and extremely complicated to calculate analytically. In addition, the perception of glare by the occupants of a perimeter building space depends on their viewing directions (e.g. the orientation of their locations) with respect to the source of glare. However, glare from windows can be controlled by controlling the ECG tint level.

Figure 4:
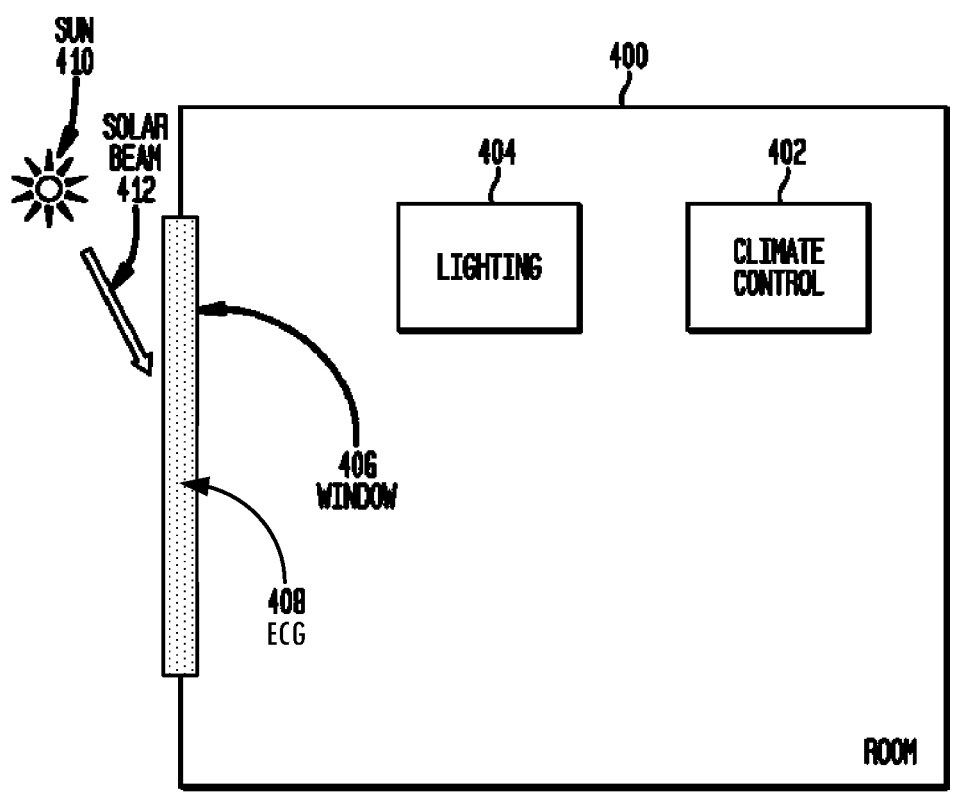
FIG. 4 illustrates a block diagram of a room that can be managed using disclosed techniques.

FIG. 4 illustrates a block diagram of a room 400 that can be managed using disclosed techniques. Room 400 includes climate control 402, which can include heating, cooling, and ventilation systems, all of which consume energy, and which can regulate the temperature and humidity of room 400. Room 400 also includes lighting 404, which consumes energy, and which can be varied in illumination depending on the natural light in the room. Room 400 has a window 406 with ECG 408. The sun 410 can illuminate room 400 through window 406, and the amount of illumination can be adjusted using ECG 408. Room 400 can lose heat or gain heat through window 406, depending on weather conditions, the sun 410, the ECG 408, and other factors. When the sun 410 has a solar beam 412 (direct sunlight) into window 406, glare in room 400 can be a significant problem, but disclosed embodiments can adjust the tint level of ECG 408 to control glare. Glare control can be used to override the calculated optimum ECG tint level described below (to minimize total energy consumption) whenever solar beam radiation is detected during occupied hours. In the specific example of the process below, the climate control 402 is implemented as radiant heating and cooling ceiling panels.

Disclosed embodiments can use an analytical process for managing energy consumption based on finding the room temperature response to solar radiation from various ECG tint levels, for any time of day or season of year. This can include solving two coupled first-order differential equations. A differential equation can be used to properly model the room temperature response to incoming solar radiation through ECG system since, in the real world, room temperature does not respond instantly to incoming solar radiation through ECG, but lags in time response due to the thermal capacitance of the room and heat flows into and out of the room.

Figure 5:
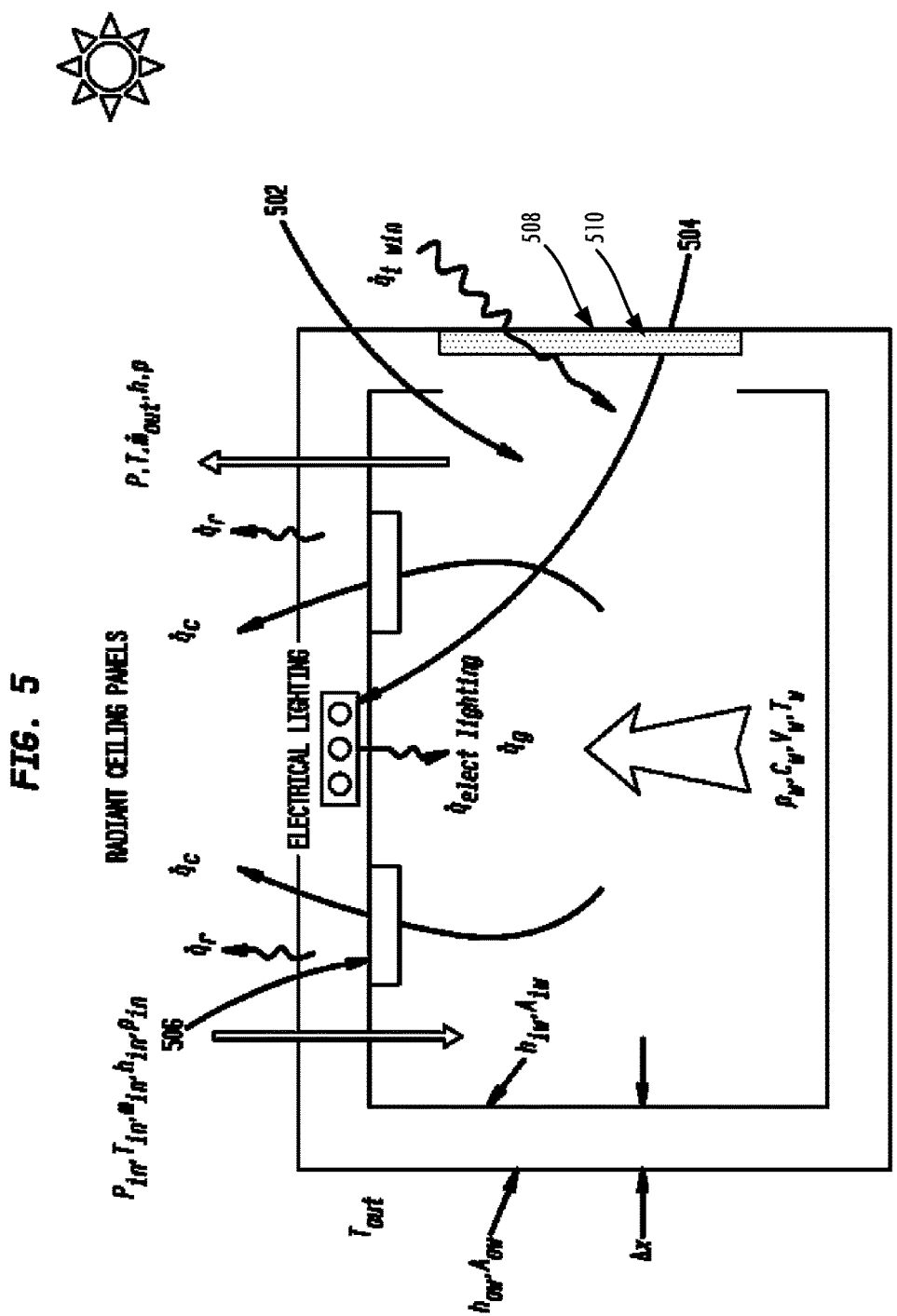
FIG. 5 illustrates an example of a system model that can be analyzed in accordance with disclosed embodiments.

FIG. 5 illustrates an example of a system model that can be analyzed in accordance with disclosed embodiments. This example illustrates a system with a radiant ceiling panel system used for terminal heating and cooling, but those of skill in the art will recognize that with only minor changes to the mathematics, this basic solution approach can be applied to a wide variety of terminal heating or cooling devices.

FIG. 5 illustrates a number of system elements that represent energy and heat transferred into and out of a room 502 having electrical lighting 504 and radiant ceiling panels 506. FIG. 5 also illustrates a window 508 with ECG 510. In this figure or as described herein, $P_{in}$=supply duct air pressure;
$P_{adj}$=air pressure in adjacent space (or outside air pressure);
$T_{in}$=supply air temperature;
T=room air temperature;
$T_w$=weighted average wall temperature;
$\dot{m}_{in}$=supply air mass flow rate;
$\dot{m}_{out}$=exhaust air mass flow rate;
$\dot{m}_{exf}$=exfiltration air mass flow rate;
$h_{in}$=supply air enthalpy;
P=room air pressure (absolute);
T T=room (dry bulb) air temperature (absolute);
$T_{out}$=air (dry bulb) temperature in adjacent space (or outside air dry bulb temperature);
m=mass of air in room;
h=enthalpy of air in room;
$\rho$=density of air in room;
$\rho_{in}$=density of supply air to room;
$\dot{q}_{twin}$=energy flux transmission of solar heat through windows;
$\dot{q}_{electlighting}$=thermal heat energy into the space from electric lighting;
$\dot{q}_g$=internal heat generation from people and equipment in room;
$\dot{q}_r$=radiant heat transfer from radiant ceiling panels;
$\dot{q}_c$=convective heat transfer from radiant ceiling panels;
$h_{iw}$=convection coefficient of inner wall surface of room
$h_{ow}$=convection coefficient of outer wall surface of room
$A_{iw}$=area of inner wall surface of room
$A_{ow}$=area of outer wall surface of room
$\Delta x_{ow}$=outside wall thickness
$k_{ow}k_{ow}$=thermal conductivity of outside wall Note that sign convention used in this figure for energy inflow into the zone is positive, and for energy outflow it is negative. The radiative and convective heat transfer is shown leaving the zone, which represents a typical cooling application.

Figure 6:
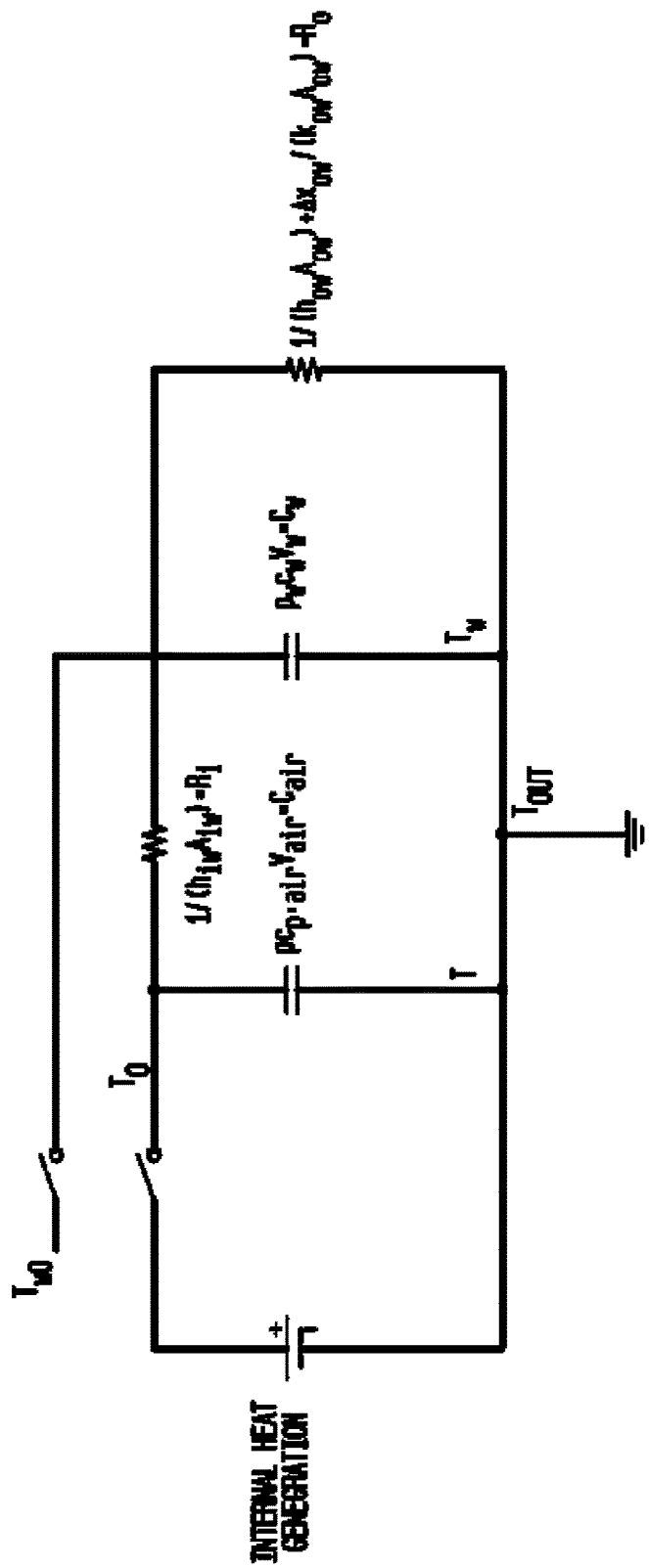
FIG. 6 illustrates an equivalent thermal network for lumped heat capacities and thermal resistances of room air and outside walls with room thermal masses in corresponding to the system illustrated in FIG. 5.

FIG. 6 illustrates an equivalent thermal network for lumped heat capacities of room air and outside walls with room thermal masses in corresponding to the system illustrated in FIG. 5. In this figure, $R_I$ represents the area transmittance between room air and walls and is equal to the thermal resistance R-value divided by the area of heat transfer surface; $R_O$ represents the area transmittance between center of wall and ambient surroundings and is equal to the thermal resistance R-value divided by the area of heat transfer surface; $C_{air}$ represents the thermal capacitance of the room air; $C_W$ represents the thermal capacitance of the surrounding walls; $h_{iw}$ represents the convection heat transfer coefficient at inner wall(s) surface; $A_{iw}$ represents the area of inner wall(s) surface; $h_{ow}$ represents the convection heat transfer coefficient at outside wall(s) surface; $A_{ow}$ represents the area of outside wall(s) surface; $k_{ow}$ represents the thermal conductivity of outside wall(s); and $\Delta x_{ow}$ represents the thickness of outside wall(s).

Figure 7:
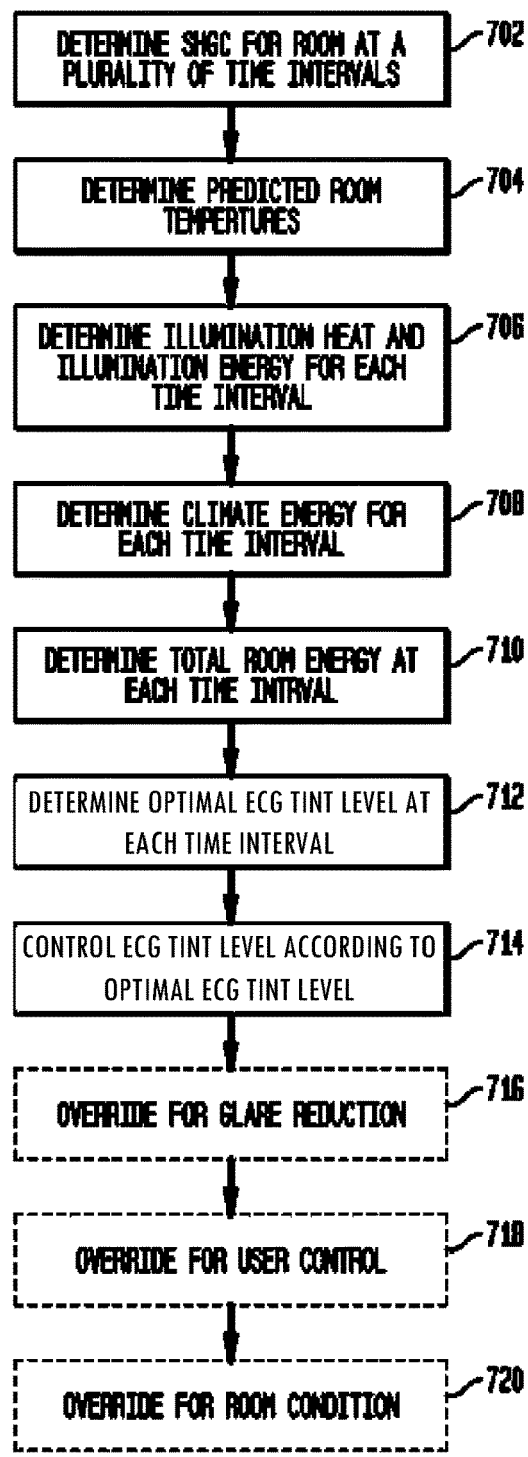
FIG. 7 illustrates a flowchart of a process in accordance with disclosed embodiments.

FIG. 7 illustrates a flowchart of a process in accordance with disclosed embodiments for integrated room management in a building management system. Such a process can be performed by a data processing system such as building automation system 100, and is referred to generically as the "system" below.

The system can determine a solar heat gain coefficient (SHGC) for a room in a building, such as based on the geographic location of the room and orientation of the outside window(s), at a plurality of time intervals (702). The time intervals can be, for example every fifteen minutes during business hours of a given day, or can be other appropriate intervals on a time and date that the room is expected to be occupied. In other cases, the SHGC may be given by the manufacturer as a function of the incoming solar radiation flux.

The SHGC can be calculated using the equation:

$$SHGC(t_i, \sigma_i) = \frac{C_{air}\frac{\partial T(t,\sigma)}{\partial t}\Big|_{t_i,\sigma_i} - \rho_{in}c_{p,a}\dot{v}_{in}(T_{in} - T|_{t_i}) - \dot{q}_g - \dot{q}_{elect\ light}(t_i, \sigma_i) - UA_{pf}(T_{out} - T|_{t_i}) - \frac{(T_w|_{t_i} - T|_{t_i})}{R_I}}{E_{ti}A_{pf}(\cos\beta_i\cos\gamma_i)}$$

where $$\sin\beta_i = \cos L \cdot \cos\delta \cdot \cos\left[15\left(t_i + \frac{E}{60} - \frac{LSM - LON}{15} - 12\right)\right] + \sin L \cdot \sin\delta$$

$\dot{q}_{elect\ lighting}$ is the instantaneous lighting thermal energy output generated by the lights in units of $$\frac{BTU}{hr}$$

and can be calculated as $$\dot{q}_{elect\ lighting} = (\text{derating per dimming level})\left[N \times \left(\frac{kW}{lamp}\right)_{elect} \times \left(\frac{3,413\ BTU/hr}{kW}\right)\right]$$

$C_{air}$ is the thermal capacitance of the room air;
L=Local latitude;
δ=solar declination angle;

$$\delta = 23.45\sin\left\{\left[360\left(\frac{284+\eta}{365}\right)\right]\right\}$$

where η=the day number of the year;
$E_n$=Equation of time in decimal minutes=9.87 sin(2B)−7.53 cos B−1.5 sin B, where $$B = \frac{360(\eta - \theta 1)}{364},$$

and η=the day number of the year;
LSM=Local Standard Meridian. Standard meridians are found every 15° from 0° at Greenwich, U.K. In the United States and Canada, these values are (i.e. the values of LSM in the above equation) are:
Atlantic Standard Time Meridian: 60° W
Eastern Standard Time Meridian: 75° W
Central Standard Time Meridian: 90° W
Mountain Standard Time Meridian: 105° W
Pacific Standard Time Meridian: 120° W
Alaska Standard Time Meridian: 135° W
Hawaii Standard Time Meridian: 150° W
LON=Local longitude;
t=local standard time in decimal hours;
cos γ=cos (φ−ψ)=cos φ·cos φ+sin φ·sin ψ, where ψ is a fixed value, depending on the surface azimuth angle orientation of the window;
β=solar altitude angle above the horizontal;
γ=surface solar azimuth angle;
φ=solar azimuth angle. The solar azimuth angle is ZERO at solar noon and at solar midnight and increases positively in the counterclockwise direction for morning hours and increases positively in the clockwise direction for afternoon hours.
Ψ=surface azimuth angle. Surfaces that face west have a positive surface azimuth ψ, while those facing east have a negative surface azimuth ψ.
$E_{ti}$=solar irradiance measurement;
i=the specific time interval;
$A_{room}$=floor area of the room (ft²).
$A_{RCP}$=area of the radiant ceiling panels (ft²).
$\dot{q}_{t\ win}$=heat transmission flux through the windows in units of $$\frac{BTU}{hr \cdot ft^2};$$

$T_{in}$=measured indoor air temperature, ° F.;
$T_{out}$=measured outdoor air temperature, ° F.;
$T_w$=weighted average wall temperature, ° F.;
$A_{pf}$=total projected area of fenestration (approximately the window's opening in the wall less installation clearances), ft2;
U=overall heat transfer coefficient of the window, $$\frac{BTU}{hr \cdot ft^2}°F.;$$

$\dot{q}_r$=radiation heat flux in units of $$\frac{BTU}{hr \cdot ft^2};$$

$\dot{q}_c$=heat flux from natural convection in $$\frac{BTU}{hr \cdot ft^2};$$

T=measured indoor space dry-bulb air temperature, ° F.;
P=absolute room air pressure $$\left(\frac{lb_f}{ft^3}\right);$$

R=Gas constant for air $$\left(=53.47\frac{ft-lb_f}{lb_m - °R}\right);$$

V=volume of the room (ft³);
$\dot{v}$=the volumetric flow rate of air in, out, or exfiltrating (exf) from the room;
$c_v$=constant pressure;
$\dot{v}_{in},\dot{v}_{in}$=supply airflow rate into the room
$c_{p,a}$=specific heat of dry air $$\left(=0.240\frac{BTU}{lb_m °F.}\right).$$

$$\rho_{in} = \frac{P_{in}}{RT_{in}},$$

where R=gas constant for air $$\left(=53.47\frac{ft-lb_f}{lb_m - °R}\right),$$

$P_{in}$=the absolute duct pressure $$\left(\frac{lb_f}{ft^2}\right),$$

and $T_{in}$=absolute supply air temperature (° R); (° R)

$$\rho = \frac{P}{RT},$$

where P=the absolute room pressure $$\left(\frac{lb_f}{ft^2}\right);$$

$\dot{q}_g$=internal heat generation from people and equipment in room;

In general, a subscript i for a variable indicates that it represents that variable's value at the time interval i.

The system determines predicted room temperatures for the room at the plurality of time intervals based on the SHGC and a plurality of ECG tint levels (704).

To determine the predicted room temperatures, the system determines the open-loop room temperature response at each time interval to get the predicted room temperature as a function of time, T(t). This can be calculated using:

$$\frac{dT(t)}{dt} = \frac{\rho_{in}\dot{v}_{in}(T_{in}-T)}{\rho V_{air}} + \frac{\dot{q}_g}{C_{air}} + \frac{\dot{q}_{elect\ light}(t)}{C_{air}} + \frac{UA_{pf}(T_{out}-T)E_{ti}A_{pf}SHGC(t_i(VLT))}{C_{air}} + \frac{T_w-T}{R_l C_{air}}$$

And $$\frac{dT_w}{dt} = \frac{(T-T_w)}{R_l C_w} + \frac{(T_{out}-T_w)}{R_O C_w}$$

Where:

$$R_l = \frac{1}{h_{iw} A_{iw}}$$

is the thermal resistance to heat transfer (due to convection) from the wall to the room $$R_O = \frac{1}{h_{ow} A_{ow}} + \frac{\Delta x_w}{k_w A_{iw}}$$

is the thermal resistance to heat transfer (due to convection and conduction) from the outside wall surface to the room
$C_w = \rho_w c_w V_w$ is the thermal capacitance of the outside wall using variables as described herein, and where
  $\beta_i$=solar altitude angle above the horizontal at time interval $t=t_i$;
  SHGC($t_i$(VLT)) is the solar heat gain coefficient at time interval $t=t_i$, which depends on the visible light transmittance (VLT). The value of SHGC($t_i$(VLT)) can be calculated by the functional relationship between the VLT and SHGC as shown in below for an exemplary implementation;

$E_{ti}$ is the measured total solar irradiance (beam+diffuse) at time interval $t=t_i$ (a constant).

Using this equation, the system can calculate the predicted room temperature for the each time interval for each ECG tint level.

The system determines illumination heat and illumination energy for the room, at each ECG tint level and at each time interval, based on an exterior illumination level for each ECG tint level, artificial lighting energy consumed, and artificial lighting heat produced to bring the room to a predetermined illumination level (706).

To do so, the system can determine the value of k from direct measurements of $E_{ti}$ and $I_{room}$ using:

$$I_{daylighting} = kE_{ti}A_{pf}f(\beta_i, \gamma_i)$$

using variables as described herein and where
  $I_{room}$=indoor illumination level (fc);
  $I_{daylight}$=indoor illumination level from daylighting (fc);
  k=constant of proportionality relating the measured indoor illumination level (fc) to the measured solar irradiance flux for the given projected area of fenestration ($A_{pf}$) and solar angles $\beta$ and $\gamma$;
  $E_{ti}$=measured total solar irradiance flux at time interval i $$\left(\frac{BTU}{hr\ ft^2}\right);$$

$A_{pf}$=projected area of fenestration (approximately=window area); and
$f(\beta_i, \gamma_i)$ is the functional relationship between solar angles $\beta$ and $\gamma$ to be established by testing in the room.

This step can include calculating the predicted workplane surface light illumination level for each projected ECG tint level, and the heat output of the lights at the corresponding dimming level. The artificial lighting energy consumed and artificial lighting heat produced to bring the room to the predetermined illumination level are measured for the installed lighting 404 based on the energy and heat produced by the lighting used to raise $I_{room}$ to the predetermined illumination level. The energy and heat required will be less when natural lighting $I_{daylight}$ is high, and higher when $I_{daylight}$ is low. These measurements need only be performed once, at various lighting/dimming levels, for the installed lighting 404 in any given room.

The system determines room climate energy, at each of the time intervals, required to maintain the room at a predetermined temperature based on the predicted open-loop room temperatures and the illumination heat at each of the time intervals (708). For any given climate control 402, the system can determine energy required to heat or cool the room to the predetermined temperature from the predicted temperatures and the heat produced from the installed lighting 404 (in the amount needed for to ensure the illumination level as described above).

The system determines a total room energy at each of the time intervals as a function of the ECG tint levels based on the climate energy, illumination energy, and predicted open-loop room temperatures (710). Here, the system can add the energy required to heat or cool the room to the predetermined temperature, by climate control 402 from the predicted temperatures and for each ECG tint level, to the illumination energy required to ensure the predetermined illumination to get a projected total room energy curve as a function of the ECG tint levels. The system determines, from the total room energy, an optimal ECG tint level at each of the time intervals. The optimal ECG tint level is the level that minimizes the total room energy at each of the time intervals (712). If the electrochromic glass manufacturer offers continuously variable tint levels for their ECG, this can be performed by taking the first derivative (or minimum) of this projected total room energy curve with respect to the ECG tint level, setting it equal to zero, and solving for the ECG tint level. This will be the optimal ECG tint level that minimizes the total room energy, while maintaining occupant comfort for illumination and temperature. In various embodiments, the optimal ECG tint level provides external illumination to the room while preventing glare.

The system can control the ECG tint levels in the room at each of the time intervals according to the optimal ECG tint level (714). Once the optimal ECG tint levels for each time interval are known, the system can adjust ECG 408 so that they are tinted at the optimal ECG tint level. This can be performed at all times, at each time interval, only when the room is occupied, or unless there is an override condition as described below.

The system can enter an override condition in response to detecting beam solar radiation in the room, which can produce unpleasant glare, and in this override condition, control the ECG tint level in the room (716). Such a case may require additional lighting or room climate energy since some of the radiant energy from the sun will be blocked.

The system can enter an override condition in response to a manual user-desired tint level of the ECG in the room, and in this override condition, controls the ECG tint levels according to the manual user control (718). Such a case may require additional or even less lighting or climate energy since the amount of radiant energy from the sun will be changed.

The system can enter an override condition in response to a room condition (720). For example, the system can determine that the room is empty, so no lighting is required, that it is night, so there is no external lighting and the ECG tint level can be completely opaque, substantially transparent, or otherwise.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A method for integrated room management in a building management system, the method performed by a data processing system and comprising:
    determining a solar heat gain coefficient (SHGC) for a room in a building at a plurality of time intervals, based on a geographic location of the room, an orientation of at least one exterior window, and a thermal capacitance of air of the room;
    determining predicted open-loop room temperatures for the room at the plurality of time intervals based on the SHGC and a plurality of electrochromic glass (ECG) tint levels for the at least one exterior window;
    determining illumination heat and illumination energy for the room, at each ECG tint level and at each time interval, based on a measured solar illumination level for each ECG tint level, artificial lighting energy consumed, and artificial lighting heat produced to bring the room to a predetermined illumination level;
    determining climate energy, at each of the time intervals, required to maintain the room at a predetermined temperature based on the predicted open-loop room temperatures and the illumination heat at each of the time intervals;
    determining a total room energy at each of the time intervals as a function of the ECG tint levels based on the climate energy, illumination energy, and predicted room temperatures;
    determining, from the total room energy, an optimal ECG tint level at each of the time intervals, wherein the optimal ECG tint level minimizes the total room energy at each of the time intervals; and
    controlling the ECG tint levels in the room at each of the time intervals according to the optimal ECG tint level, unless there is an override condition.

2. The method of claim 1, wherein the building management system enters an override condition in response to detecting beam solar radiation in the room, and thereafter controls the ECG tint level in the room.

3. The method of claim 1, wherein the building management system enters an override condition in response to a manual user control of the ECG tint level in the room, and thereafter controls the ECG tint level according to the manual user control.

4. The method of claim 1, wherein the SHGC is also based at least in part on a solar azimuth at each time interval, a solar declination, a surface azimuth, and a heat transmission flux of the at least one exterior window.

5. The method of claim 1, wherein the SHGC is also based on measured indoor and outdoor temperatures and an area of fenestration of the room.

6. The method of claim 1, wherein the optimal ECG tint level provides external illumination to the room while preventing glare.

7. A method for integrated room management in a building management system, the method performed by a data processing system and comprising:
- determining predicted room temperatures for a room at a plurality of time intervals and a plurality of electrochromic glass (ECG) tint levels, using a calculated solar heat gain coefficient (SHGC) for the room at each of the plurality of time intervals, wherein the SJGC is based on a geographic location of the room, an orientation of at least one exterior window, and a thermal capacitance of air of the room;
- determining an optimal ECG tint level at each of the time intervals, wherein the optimal ECG tint level minimizes a total room energy at each of the time intervals; and
- controlling the ECG tint levels in the room at each of the time intervals according to the optimal ECG tint level.

8. A building management system comprising:
- a processor;
- an accessible memory;
- a climate control for a room in a building;
- lighting for the room; and
- electrochromic glass (ECG) for windows of the room, the building management system particularly configured to
  - determine a solar heat gain coefficient (SHGC) for the room at a plurality of time intervals, based on a geographic location of the room, an orientation of at least one exterior window, and a thermal capacitance of air of the room;
  - determine predicted room temperatures for the room at the plurality of time intervals based on the SHGC and a plurality of ECG tint levels for the at least one exterior window;
  - determine illumination heat and illumination energy for the room, at each ECG tint level and at each time interval, based on an exterior illumination level for each ECG tint level, artificial lighting energy consumed by the lighting, and artificial lighting heat produced by the lighting to bring the room to a predetermined illumination level;
  - determine climate energy, at each of the time intervals, required to maintain the room at a predetermined temperature by the climate control based on the predicted room temperatures and the illumination heat at each of the time intervals;
  - determine a total room energy at each of the time intervals as a function of the ECG tint levels based on the climate energy, illumination energy, and predicted room temperatures;
  - determine, from the total room energy, an optimal ECG tint level at each of the time intervals, wherein the optimal ECG tint level minimizes the total room energy at each of the time intervals; and
  - control the ECG tint level in the room at each of the time intervals according to the optimal ECG tint level, unless there is an override condition.

9. The building management system of claim 8, wherein the system enters an override condition in response to detecting beam solar radiation in the room, and thereafter controls the ECG tint level.

10. The building management system of claim 8, wherein the system enters an override condition in response to a manual user control of the ECG tint level, and thereafter controls the ECG tint level according to the manual user control.

11. The building management system of claim 8, wherein the SHGC is also based at least in part on a solar azimuth at each time interval, a solar declination, a surface azimuth, and a heat transmission flux of the at least one exterior window.

12. The building management system of claim 8, wherein the SHGC is also based on measured indoor and outdoor temperatures and an area of fenestration of the room.

13. The building management system of claim 8, wherein the climate energy is consumed by a climate control that includes radiant heat panels.

14. The building management system of claim 8, wherein the optimal ECG tint level provides external illumination to the room while preventing glare.

15. A non-transitory computer-readable medium encoded with executable instructions that, when executed, cause a building management system to:
- determine a solar heat gain coefficient (SHGC) for a room in a building at a plurality of time intervals, based on a geographic location of the room, an orientation of at least one exterior window, and a thermal capacitance of air of the room;
- determine predicted open-loop room temperatures for the room at the plurality of time intervals based on the SHGC and a plurality of electrochromic glass (ECG) tint levels for the at least one exterior window;
- determine illumination heat and illumination energy for the room, at each ECG tint level and at each time interval, based on an exterior illumination level for each ECG tint level, artificial lighting energy consumed, and artificial lighting heat produced to bring the room to a predetermined illumination level;
- determine climate energy, at each of the time intervals, required to maintain the room at a predetermined temperature based on the predicted room temperatures and the illumination heat at each of the time intervals;
- determine a total room energy at each of the time intervals as a function of the ECG tint level based on the climate energy, illumination energy, and predicted room temperatures;
- determine, from the total room energy, an optimal ECG tint level at each of the time intervals, wherein the optimal ECG tint level minimizes the total room energy at each of the time intervals; and
- control the ECG tint level in the room at each of the time intervals according to the optimal ECG tint level, unless there is an override condition.

16. The computer-readable medium of claim 15, wherein the building management system enters an override condition in response to detecting beam solar radiation in the room, and thereafter controls the ECG tint level.

17. The computer-readable medium of claim 15, wherein the building management system enters an override condition in response to a manual user control of the ECG tint level, and thereafter controls the ECG tint level according to the manual user control.

18. The computer-readable medium of claim 15, wherein the SHGC also based at least in part on a solar azimuth at each time interval, a solar declination, a surface azimuth, and a heat transmission flux of the at least one exterior window.

19. The computer-readable medium of claim 15, wherein the SHGC is also based on measured indoor and outdoor temperatures and an area of fenestration of the room.

20. The computer-readable medium of claim 15, wherein the climate energy is consumed by a climate control that includes radiant heat panels.

\* \* \* \* \*